Feb. 24, 1925. Re. 16,008

G. C. DEBAY

BUILDING BLOCK MOLDING MACHINE

Original Filed Dec. 8, 1919 2 Sheets-Sheet 1

INVENTOR

George C. Debay

By Kay Fothergill Barnes

Attys

Feb. 24, 1925. Re. 16,008

G. C. DEBAY

BUILDING BLOCK MOLDING MACHINE

Original Filed Dec. 8. 1919 2 Sheets-Sheet 2

INVENTOR

George C. Debay

By Kay, Fitzhugh & Brown

Attys.

Reissued Feb. 24, 1925. Re. 16,008

UNITED STATES PATENT OFFICE.

GEORGE C. DEBAY, OF SPRINGDALE, PENNSYLVANIA, ASSIGNOR, BY MESNE ASSIGNMENTS, TO THE KELBAY CORPORATION OF AMERICA, A CORPORATION OF DELAWARE.

BUILDING-BLOCK-MOLDING MACHINE.

Original No. 1,362,928, dated December 21, 1920, Serial No. 343,182, filed December 8, 1919. Application for reissue filed July 5, 1922. Serial No. 573,046.

*To all whom it may concern:*

Be it known that I, GEORGE C. DEBAY, a citizen of the United States, and resident of Springdale, in the county of Allegheny and State of Pennsylvania, have invented a new and useful Improvement in Building-Block-Molding Machines; and I do hereby declare the following to be a full, clear, and exact description thereof.

My invention relates to a machine for forming building blocks, and more especially to blocks made of a plastic material with air spaces or openings formed therein.

The object of my invention is to provide a machine of this character in which the blocks can be formed accurately, with great rapidity, and at greatly reduced cost.

To these ends my invention comprises the novel features hereinafter set forth and claimed.

Figures 1, 5:
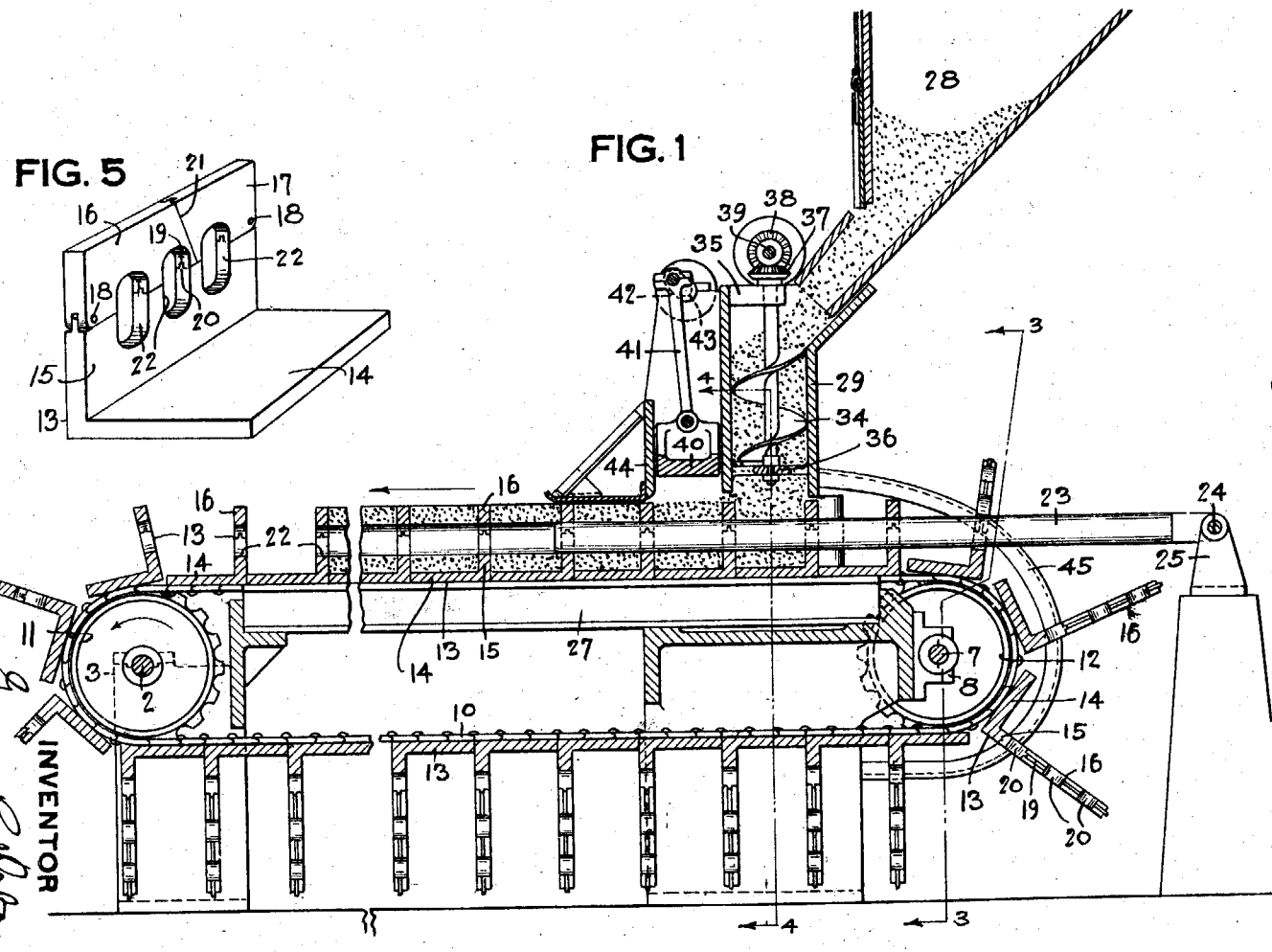
Figures 2, 3, 4, 6:
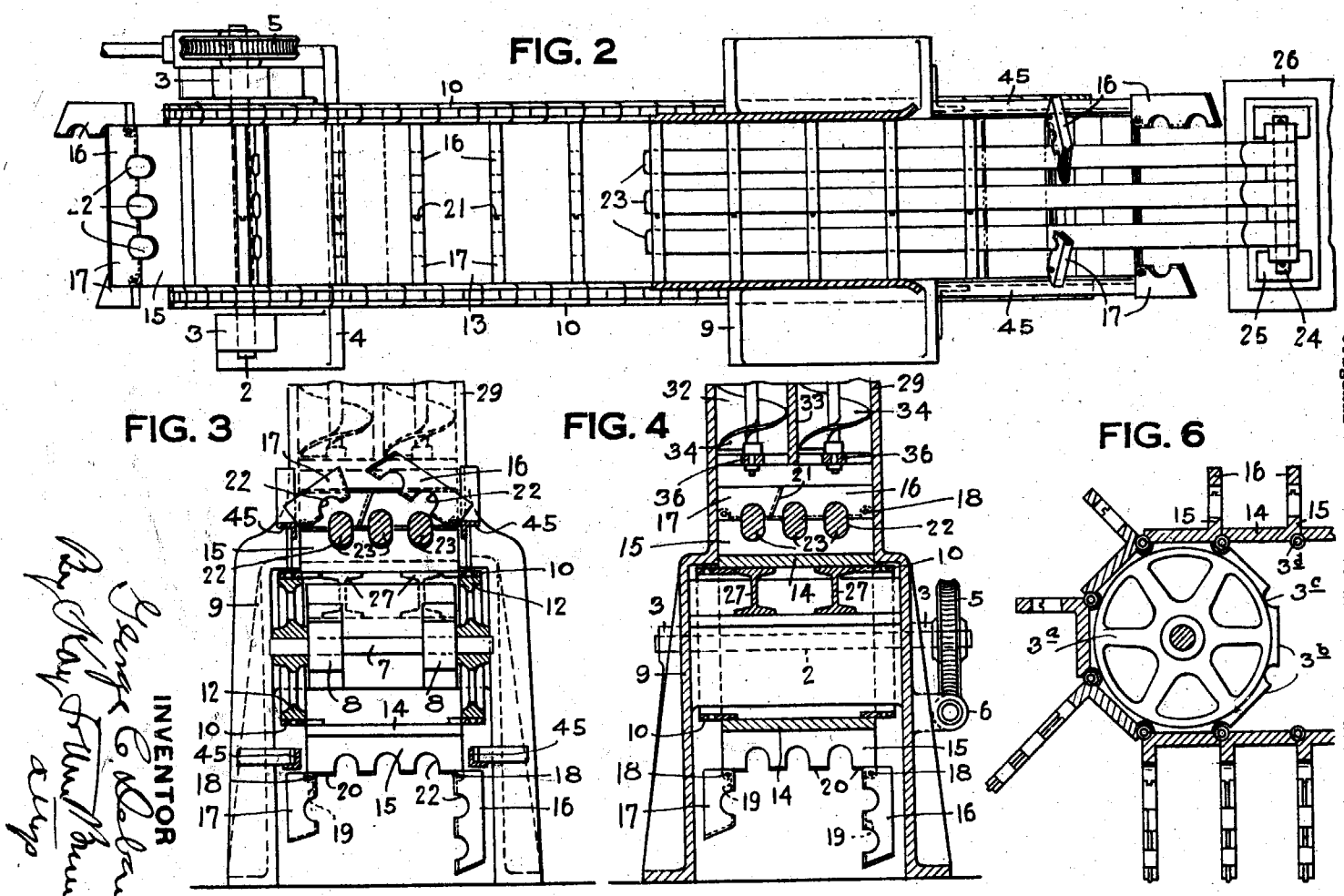

In the accompanying drawings, Figure 1 is a longitudinal section of my improved machine; Fig. 2 is a plan view; Fig. 3 is a cross section on the line 3—3, Fig. 1; Fig. 4 is a cross section on the line 4—4, Fig. 1; Fig. 5 is a perspective view of the traveling mold plate; and Fig. 6 shows a modified form of my invention.

In the drawings, the numeral 2 is a shaft mounted in suitable bearings 3 in the frame 4, said shaft having a worm-wheel 5 keyed thereto driven by the worm 6.

A shaft 7 is mounted in suitable bearings 8 in the frame 9, said shaft being in line with the shaft 2.

An endless conveyer or chain 10 is mounted on the sprocket wheels 11 and 12, mounted on the shafts 2 and 7, respectively. Secured to the endless chain 10 are the mold-members 13 which form the bottom 14 and one of the sides 15 of the mold. The mold-members are so mounted on the endless chain 10 as to have the necessary flexibility in passing around the wheels 11 and 12, as indicated in Fig. 1.

The side-plate 15 of the mold-member 13 has the upper portion made in two sections 16 and 17, hinged as at 18 so as to be free to swing vertically. Grooves 19 are formed in the bottom edges of the swinging sections 16 and 17, said grooves engaging the rabbet 20 formed on the upper edge of the side-portion 15. The inner ends of the sections 16 and 17 are beveled to form a bevel-joint 21.

The side portion 15 and the swinging-sections 16 and 17 are cut away to form in conjunction with each other the openings 22.

Core-bars or members 23 are pivotally mounted as at 24 in the standards 25 on the pedestals 26, the number of said core-cars corresponding to the number of openings 22 in the mold-members 13, the outer ends of said core-bars being supported by said members, as indicated in Fig. 1.

I-beams 27 are carried by the frames 4 and 9, and said I-beams form supports or guides for the mold-members 13 as they are brought up into position where the molding takes place, and as they pass therefrom with the molded blocks therein.

The chute 28 is provided to receive the plastic material from which the blocks are to be formed and the lower end of said chute communicates with the receptacle 29, the side-walls 30 of which extend down to form the end-walls of the mold, the sides of which are made up of the mold-members 13, as clearly shown in Fig. 4.

The receptacle 29 is preferably divided into two compartments 31 and 32 divided by the partition 33. Located in each compartment 31 and 32 are the spiral conveyers 34, shafts of said conveyers being journaled at their ends in the bearing-block 35 and the lower ends journaled in the spider-plate 36. At the upper ends of the conveyer shafts are the bevel-pinions 37 engaged by the bevel-pinions 38 on the horizontal shaft 39 which may be driven by any suitable power.

In this manner the plastic material contained within the receptacle 29 is conveyed down and delivered into the molds as the mold-members come around into position to form with the side-walls 30 of the receptacle 29 the molds for the blocks.

In front of the receptacle 29 is the compressor-block 40 which has a reciprocating motion imparted to it by the pitman-rod 41 connected up to the crank-arm 42 on the shaft 43 which may be driven by any suitable power.

The compressor-block 40 moves up and down in the guides formed by one of the walls or receptacles 29 and the guide-member 44. In this manner pressure may be supplied by the compressor-block 40 to the block being formed where necessary. Guide-bars 45 are in the path of movement of the swinging sections 16 and 17 of the mold-members and engaging the ends of said sections will move the same over to engage the core-bars as will more fully hereinafter appear.

In operation the plastic material from which the blocks are to be formed is delivered from the hopper 28 into the receptacle 29, and is forced downwardly by the spiral conveyers 34 and delivered into the molds as they come around into position continuously to receive the material. The material will be forced with considerable pressure by the spiral conveyers 34 into the molds, but if it is found desirable to add additional pressure, the compressor-block 40 is so timed to operate as each mold comes into position beneath the same and in this way the block is further compressed.

Each mold is made up of the side-plate of the preceding mold-member and the bottom and side of the following mold-member, together with the sides 30 of the receptacle 29. The blocks as they are formed pass along continuously and as they approach the outer end of the conveyer they are removed in any suitable manner, and the mold-members continue around and when they get beyond the front wheels 11 of the conveyer on the return the swing sections 16 and 17 will swing outwardly as indicated in Fig. 1, and will remain in this position until they come into engagement with the bars 45 which engage the ends of said swinging sections and throw them up into position where they will drop down onto the plate 15 to encircle the core-bars 23, as clearly indicated in Figs. 3 and 4 of the drawings.

In this manner, I am enabled to employ stationary core-bars as the swinging sections permit the mold-members to clear the core-bars, as clearly indicated in Fig. 2, and after the core-bars are passed the bars 45 throw the swinging sections over in position to inclose said core-bars in conjunction with the plates 15.

By my improved apparatus, I am enabled to form the blocks continuously, one mold being brought up into position as another passes beyond the receptacle 29 whereby the blocks are formed in succession with great rapidity, and the old and laborious method of pressing blocks one at a time in a press is done away with.

In Fig. 6 I have shown a modified form of my invention in which the wheels $3^a$ have the flat faces $3^b$ with intervening grooves $3^c$ so that the bottom pieces of the mold members will engage said faces and the hinge connections $3^d$ will enter said grooves $3^c$.

What I claim is:

1. In apparatus for molding blocks, the combination of an endless conveyer, mold-members carried thereby, each member forming the bottom and one side of the mold, the upper portion of the side of said mold-member formed of movable sections, and a stationary core-bar adapted to engage an opening formed in said side whereby said sections may be moved into position over said core-bar to inclose same.

2. In apparatus for forming blocks, the combination of an endless conveyer, mold-members carried thereby, each member forming the bottom and one side of the mold, the upper portion of the side of said mold-member being formed of swinging sections, and a stationary core-bar adapted to engage an opening formed in said side whereby said sections may be swung into position over said core-bar to inclose same.

3. In apparatus for forming blocks, the combination with an endless conveyer, mold-members carried thereby, each member forming the bottom and one side of the mold, the upper portion of the side of said mold member being formed of swinging sections, a stationary core-bar adapted to engage an opening formed in said side, and means for swinging said sections over said core-bar to inclose same.

4. In apparatus for molding blocks, the combination of an endless conveyer, mold-members carried thereby, each member forming the bottom and one side of the mold, the upper portion of the side of said mold-member being formed of swinging sections, a stationary core-bar engaging an opening formed in said side, and guide-bars in the path of said movable sections whereby said movable sections are moved into position over said core-bar to inclose same.

5. In apparatus for forming molding blocks, the combination of an endless conveyer, mold-members carried thereby each member forming the bottom and one side of the mold, the upper portion of the side mold-member being formed of swinging sections, said sections engaging said side with a tongue and groove joint, and a stationary core-bar adapted to engage an opening formed in said side, whereby said sections may be moved in position over said core bar to inclose same.

6. In apparatus for molding blocks, the combination of an endless conveyer, mold-members carried thereby, each member forming the bottom and one side of the mold, the upper portion of the side of said mold-member being formed of movable sections, a stationary core-bar engaging an opening formed in said side whereby said sections may be moved into position over said core bars to inclose same, and means for feeding the material to the mold.

7. In apparatus for molding blocks, the combination of an endless conveyer, mold-members carried thereby, each member forming the bottom and one side of the mold, the upper portion of the side of said mold-member being formed of movable sections, a stationary core-bar engaging an opening formed in said side whereby said sections may be moved into position over said core-bar to inclose same, a receptacle for containing the material to form the blocks, and feeding mechanism in said receptacle for delivering material to the mold.

8. In apparatus for molding blocks, the combination of an endless conveyer, mold-members carried thereby, each member forming the bottom and one side of the mold, the upper portion of the side of said mold-member being formed of movable sections, a stationary core-bar engaging an opening formed in said side whereby said sections may be moved into position over said core-bar to inclose same, a receptacle for containing the material to form the blocks, and a spiral conveyer in said receptacle for delivering material to the mold.

9. In apparatus for forming blocks, the combination of an endless conveyer, mold-members carried thereby, each member forming the bottom and one side of the mold, the upper portion of the side of said mold-member being formed of movable sections, a stationary core-bar engaging an opening formed in said side whereby said sections may be moved into position over said core-bar to inclose same, a receptacle for the material for forming the block, the walls of said receptacle forming with said mold-members the mold cavity.

10. In apparatus for forming molding blocks, the combination of an endless conveyer, mold-members carried thereby, each member forming the bottom and one side of the mold, the upper portion of the side of said mold-member being formed of movable sections, a stationary core-bar adapted to engage openings formed in said side whereby said sections may be moved into position over said core-bar to inclose same, means for delivering material to the molds, and a compressor for compressing material in said molds.

11. In apparatus for molding blocks, the combination of an endless conveyer, mold-members carried thereby, the upper portion of the side of a mold member formed of movable sections, and a stationary core-bar adapted to engage an opening formed in said side whereby said sections may be moved into position over said core-bar to inclose same.

12. In apparatus for molding blocks, the combination of endless conveying mechanism, a stationary core-bar, and mold side members carried by said conveying mechanism composed of separable sections having coinciding openings formed therein adapted to receive said stationary core-bar.

13. A machine for forming cored blocks of plastic material, comprising an endless conveyor having one flight thereof movable through a rectilinear path, open-top molds carried by said conveyor and having openings in their front and rear walls, and a rectilinear core bar passing through said openings and having one of its ends supported adjacent to the beginning of said flight, the point of support being in substantial alignment with the longitudinal center lines of said molds when traveling in said path.

GEORGE C. DEBAY.